(12) United States Patent
Jiang et al.

(10) Patent No.: US 9,522,838 B2
(45) Date of Patent: Dec. 20, 2016

(54) APPARATUS AND METHOD FOR PRODUCING CORE ROD OF OPTICAL FIBER

(71) Applicant: Zhongtian Technology Advanced Materials Co., Ltd., Nantong (CN)

(72) Inventors: Xinli Jiang, Nantong (CN); Xikai Xu, Nantong (CN); Jinwen Chen, Nantong (CN); Hui Zhou, Nantong (CN); Benhua Qian, Nantong (CN)

(73) Assignee: ZHONGTIAN TECHNOLOGY ADVANCED MATERIALS CO., LTD., Nantong (CN)

( * ) Notice: Subject to any disclaimer, the term of this patent is extended or adjusted under 35 U.S.C. 154(b) by 0 days.

(21) Appl. No.: 14/709,506

(22) Filed: May 12, 2015

(65) Prior Publication Data

US 2015/0239768 A1    Aug. 27, 2015

Related U.S. Application Data

(63) Continuation-in-part of application No. PCT/CN2013/072603, filed on Mar. 14, 2013.

(30) Foreign Application Priority Data

Dec. 17, 2012  (CN) .......................... 2012 1 0546942

(51) Int. Cl.
*C03B 37/012* (2006.01)
*C03C 25/68* (2006.01)
*C03C 23/00* (2006.01)

(52) U.S. Cl.
CPC ..... *C03B 37/01211* (2013.01); *C03B 37/0126* (2013.01); *C03B 37/01248* (2013.01); *C03C 23/0075* (2013.01); *C03C 25/68* (2013.01); *C03B 2203/22* (2013.01)

(58) Field of Classification Search
CPC ........... C03B 37/01211; C03B 37/0126; C03B 37/01248; C03B 2203/22
See application file for complete search history.

(56) References Cited

U.S. PATENT DOCUMENTS

| | | | | |
|---|---|---|---|---|
| 5,127,929 | A * | 7/1992 | Gunther | C03B 23/07 65/271 |
| 6,836,605 | B2 * | 12/2004 | Hirano | C03B 37/01211 385/123 |
| 2005/0204780 | A1 * | 9/2005 | Moridaira | C03B 37/01211 65/407 |

* cited by examiner

*Primary Examiner* — Queenie Dehghan
(74) *Attorney, Agent, or Firm* — Matthias Scholl, PC; Matthias Scholl

(57) ABSTRACT

An apparatus and a method for producing a depressed-cladding core rod of an ultra-low water peak optical fiber, the apparatus including a core rod component, an inner cladding casing component, a high temperature heat source, chucks, a rotary joint, an external gas pipe, and a pressure controlling pipe. The core rod component is produced by fusing and splicing a core layer rod and a first hollow shaft together. The inner cladding casing covers the outside of the core layer rod. The inner cladding casing component is produced by fusing and splicing an inner cladding casing and a second hollow shaft together. These two hollow shafts are clamped in two chucks of a glass lathe. A high temperature heat source is arranged outside the inner cladding casing.

14 Claims, 3 Drawing Sheets

APPARATUS AND METHOD FOR PRODUCING CORE ROD OF OPTICAL FIBER

CROSS-REFERENCE TO RELATED APPLICATIONS

This application is a continuation-in-part of International Patent Application No. PCT/CN2013/072603 with an international filing date of Mar. 14, 2013, designating the United States, now pending, and further claims priority benefits to Chinese Patent Application No. 201210546942.0 filed Dec. 17, 2012. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, Mass. 02142.

BACKGROUND OF THE INVENTION

1. Field of the Invention

The present invention relates to an apparatus and a method for producing a depressed-cladding core rod of an ultra-low water peak optical fiber. The method avoids contamination of the interface and the inside of the core rod by moisture and impurities in the air.

2. Description of the Related Art

Process of producing optical fiber normally includes three steps. The first step is producing the core rod. The core rod usually consists of two parts: the core layer and the inner cladding layer. The methods of producing a core rod mainly include vapor axial deposition method (VAD), modified chemical vapor deposition method (MCVD), plasma chemical vapor deposition method (PCVD), and outside vapor deposition (OVD). The second step is adding an outer cladding layer outside the core rod. The third step is drawing to produce the optical fiber.

The methods for adding an outer cladding layer outside the core rod mainly include rod-in-tube method (RIT), rod-in-cylinder method (RIC), and outer cladding deposition method. The rod-in-tube method is inserting the core rod into a casing tube, fusing the casing tube and the core rod together in a high temperature to form a solid preform. The rod-in-cylinder method is also inserting the core rod into a casing tube, while the fusing process of the casing tube accompanies with a process of drawing. The outer cladding deposition method takes advantage of technologies such as soot cladding, advanced plasma vapor deposition method (APVD), and plasma outside vapor deposition method (POD) to add an outer cladding outside the core rod to produce a solid preform. In order to control the production cost of the optical fiber, the fraction of the impurities (especially the moisture) in the material of the outer cladding layer is usually higher than that in the core rod, and the physical and chemical properties of the outer cladding are not so good as those of the core rod. Furthermore, deposition of the outer cladding layer is usually performed in a high temperature that affects the quality of the core rod. In order to eliminate the influence of the material and the deposition process on the quality of the core rod, the thickness of the inner cladding layer is usually not smaller than 10 times the wavelength of the propagating light. To satisfy this demand, the ratio of the outer diameter of the inner cladding layer to the outer diameter of outer cladding layer is usually not smaller than 4.

Among the methods of producing a core rod, VAD method is widely used because it has fewer requirements on the purity of raw materials, a relative high deposition speed, and better dehydration effects. VAD method is capable of continuously producing large-sized preform, which has a refractive index profile that does not have depression in the center. However, during the processes of dehydroxylation and sintering, the fluorine doped in the inner cladding layer easily permeates the core layer or evaporates in a high temperature to be taken away by the dry gas ($Cl_2$ and He). Thus, in the core rod produced by traditional VAD method, the difference of the depressed refractive indexes usually does not reach −0.003 (approximate −0.2% of $n(SiO_2)$, in which $n(SiO_2)$ represents the refractive index of $SiO_2$). Therefore, it is difficult to achieve a complex refractive index profile (e.g., that of an inner cladding layer in shape of concave and convex in turn) using traditional VAD method. This disadvantage limits the application of traditional VAD method to only production of single model optical fiber having a simple refractive index profile without deep depression, such as G652, G657 A1/G657 A2, etc.

SUMMARY OF THE INVENTION

In view of the above-described problems, it is one objective of the invention to provide an apparatus and a method for producing a depressed-cladding core rod of an ultra-low water peak optical fiber. The apparatus and the method use the core rod produced by VAD or OVD method and the casing produced by MCVD, PCVD, or POD method to produce depressed-cladding core rod for an ultra-low water peak optical fiber.

To achieve the above objective, the following technical schemes are provided.

The apparatus for producing a depressed-cladding core rod of an ultra-low water peak optical fiber comprises a core rod component, an inner cladding casing component, a high temperature heat source, chucks, a rotary joint, an external gas pipe, and a pressure controlling pipe.

The core rod component is produced by fusing and splicing a core layer rod and a hollow shaft together. A plurality of vents are drilled on the hollow shaft at the end near the core layer rod. The inner cladding casing component is produced by fusing and splicing an inner cladding casing and a hollow shaft together. The inner diameter of the inner cladding casing is at least 0.3 mm larger than the outer diameter of the core layer rod. The inner cladding casing covers the outside of the core layer rod and the distance between the inner cladding casing and the core layer rod is 0.15 to 5 mm.

The hollow shaft of the core rod component and the hollow shaft of the inner cladding casing component are clamped respectively in two chucks of a glass lathe. The outer end of the hollow shaft of the core rod component is connected to an external gas pipe via the rotary joint. Various gases are transported through the external gas pipe. These gases include, while not limited to, purge gas, dry gas, and etching gas. The purge gas may be purified $N_2$, $O_2$, He, etc. The dry gas may be $Cl_2$. The etching gas may be $CF_4$, $C_2F_6$, $SF_6$, etc. The external gas pipe is connected to the pressure controlling pipe and a scrubber. The scrubber is adapted to treat exhaust gas. The outer end of the hollow shaft of the inner cladding casing component is connected to the scrubber and is adapted to control the pressure within the gap between the inner cladding casing and the core layer rod. The outer end of the inner cladding casing is connected to the hollow shaft of core rod component in an airtight manner. The position of connection needs to be outside the vents to ensure that the external gas pipe is communicated with the gap between the inner cladding casing and the core layer rod. The airtight manner may be mechanical airtight or fusion-sealing manner in high temperature. Fusion-sealing manner is used.

The high temperature heat source is arranged on the outside of the inner cladding casing. The high temperature heat source may be a gas blowtorch or furnace.

The refractive index profile of the preform produced by the above-mentioned apparatus includes a core layer, an inner cladding layer, and an outer cladding layer.

The above-mentioned core layer is produced by VAD or OVD method. It includes a core layer and a small fraction of inner cladding. In the core layer rod, the cladding-to-core diameter ratio may be less than 4, and may be close to 1. The inner cladding layer which has a particular refractive index profile is an inner cladding casing produced by other methods. The outer cladding layer is produced by casing tube or deposition method.

A method for producing a depressed-cladding core rod of an ultra-low water peak optical fiber, including the following steps:

1) producing a core rod component: using a glass lathe to fuse and splice a core layer rod and a core rod hollow shaft together;
2) producing an inner cladding casing component: using the glass lathe to fuse and splice an inner cladding casing and a casing hollow shaft together, the inner diameter of the inner cladding casing is at least 0.3 mm larger than the outer diameter of the core layer rod;
3) disposing the core rod hollow shaft and the casing hollow shaft respectively in two chucks of the glass lathe, the distance between the inner cladding casing and the core layer rod is 0.15 to 5 mm;
4) cutting off the connections among a pressure controlling pipe, a scrubber, and a vacuum pump, then connecting the core rod hollow shaft to an external gas pipe via a rotary joint, and then connecting the casing hollow shaft to the scrubber;
5) connecting the inner cladding casing to the core rod hollow shaft hermetically;
6) turning on the glass lathe, rotational speeds of the two chucks are 20 to 100 rpm;
7) transporting a first mixture gas comprising a purge gas and a dry gas to the core rod hollow shaft at room temperature for approximate 2 minutes via the external gas pipe, a flow rate ratio of the purge gas to the dry gas is from 20:1 to 80:1;
8) while transporting the first mixture gases to the core rod hollow shaft continuously in a flow rate ratio of the purge gas to the dry gas of from 20:1 to 80:1, moving a high temperature heat source back and forth twice to warm the inner cladding casing, a speed of moving the high temperature heat source is 50 to 200 mm per minute and a temperature of an inner wall of the inner cladding casing is approximately 300° C. to 800° C.;
9) transporting a second mixture gas comprising the purge gas and an etching gas to the core rod hollow shaft to clean the interfaces of the glass, the flow rate ratio of the purge gas to the etching gas is 5:1 to 20:1; then moving the high temperature heat source from where the second mixture gas flows in to where the second mixture gas flows out so that the etching gas decomposes and reacts with the glass at a temperature of 1200° C. to 1900° C., and the moving speed of the high temperature heat source is 20 to 100 mm per minute; and then adjusting a pressure within the gap between the inner cladding casing and the core layer rod to prevent the outer diameter of the inner cladding casing from shrinking or expanding at a high temperature, the pressure within the gap between the inner cladding casing and the core layer rod is from 30 Pa to 400 Pa;
10) transporting the first mixture gas, the flow rate ratio of the purge gas to the dry gas is 20:1 to 80:1, and the pressure within the gap between the inner cladding casing and the core layer rod is lower than 60 Pa; then heating the inner cladding casing with the high temperature heat source at the end where the gases flow out, i.e., at the end near the casing hollow shaft, to induce shrinkage of the inner cladding casing; and then opening the pressure controlling pipe and fusing the inner cladding casing and the core layer rod together at the end where the gases flow out when the gap between the inner cladding casing and the core layer rod disappears;
11) transporting the first mixture gas, the flow rate ratio of the purge gas to the dry gas is 20:1 to 80:1, the tube pressure is controlled according to the thickness of the inner cladding casing in a range of from +60 Pa to −99 kPa; then opening the connection between the pressure controlling pipe and the vacuum pump when a negative pressure is required, and then moving the high temperature heat source towards the end where the gases flow in to heat the inner cladding casing and to fuse the inner cladding casing with the core layer rod, the speed of moving the high temperature heat source is 5 to 100 mm per minute; and
12) controlling a vacuum degree of the gases in the external gas pipe and the pressure controlling pipe in a range of from +60 Pa to −99 kPa, controlling the temperature of high temperature heat source in a range of 1200° C. to 1900° C., and controlling the speed of moving the high temperature heat source to be 5 to 100 mm per minute to fuse the inner cladding casing with the core layer rod to provide a depressed-cladding core rod not having interfacial air bubbles and air lines and having an acceptable roundness.

The key step is combining the inner cladding casing and the core layer rod to form a solid core rod by a modified rod-in-tube method. In traditional rod-in-tube method, because the inner surface of the inner cladding and the outer surface of the core layer rod are directly exposed to the air, moisture and other impurities in the air will permeate and pollute the inner cladding casing and the core layer rod when they are heated under a high temperature, which affects the quality of the optical fiber and causes an increased attenuation of the optical fiber at 1383 nm. The less the cladding-to-core diameter ratio is, the more largely the disadvantages of the traditional rod-in-tube method affect the quality of the optical fiber. The conventional rod-in-tube method is modified in order to get rid of the moisture and other impurities in the gap.

Advantages of the invention are summarized below: The core layer and the inner cladding layer are produced by different apparatuses and methods. The core rod produced by combining such core layer and inner cladding layer together has deeply depressed or complex refractive index profile. The attenuation of the optical fiber which is formed by drawing the produced core rod is less than 0.33 dB/km at 1383 nm, which means the optical fiber is suitable for long distance transmission. This largely reduces the cost on optical amplifiers and repeaters which are required in long distance transmission. Furthermore, it apparently reduces the cost of maintenance. The preform produced by the method and apparatus of the invention can be processed into optical fibers having an ultra-low refractive index and ultra-low water peaks and suitable for long distance transmission.

Figure 1:
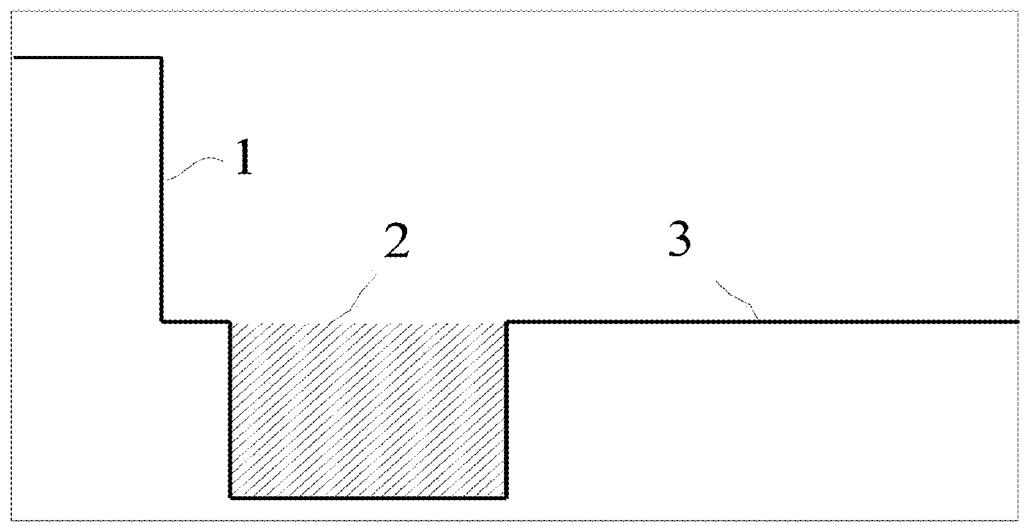
FIG. 1 is a schematic diagram of the refractive index profile of the depressed cladding ultra-low water peak optical fiber.

In the drawings, the following reference numbers are used: 1. core layer; 2. inner cladding layer; 3. outer cladding layer; 4. hollow shaft of the core rod component; 5. core layer rod; 6. inner cladding casing; 7. hollow shaft of the inner cladding casing component; 8. high temperature heat source; 9. chuck; 10. rotary joint; 11. external gas pipe; and 12. pressure controlling pipe.

DETAILED DESCRIPTION OF THE EMBODIMENTS

To further illustrate the invention, an apparatus and a method of producing a depressed-cladding core rod of an ultra-low water peak optical fiber are described below. It should be noted that the following examples are intended to describe and not to limit the invention.

Detailed description of embodiments of the invention will be given below in conjunction with accompanying FIGS. 1-5.

As shown in FIGS. 2-5, the apparatus of producing a depressed-cladding core rod of an ultra-low water peak optical fiber includes a core rod component, an inner cladding casing component, a high temperature heat source 8, chucks 9, a rotary joint 10, an external gas pipe 11, and a pressure controlling pipe 12.

Figure 2:
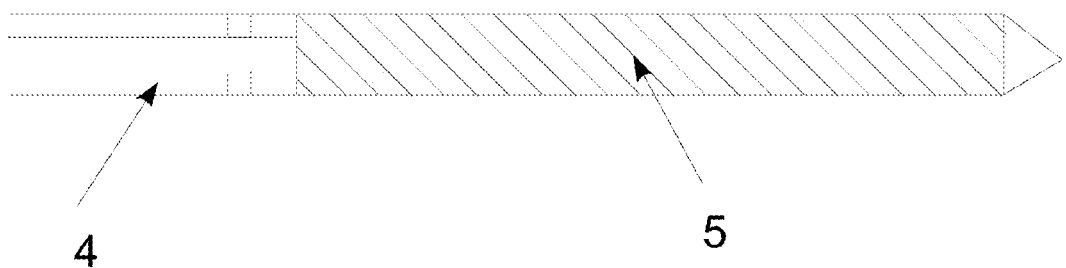
FIG. 2 is a schematic diagram of the core rod component of the invention.
Figure 3:
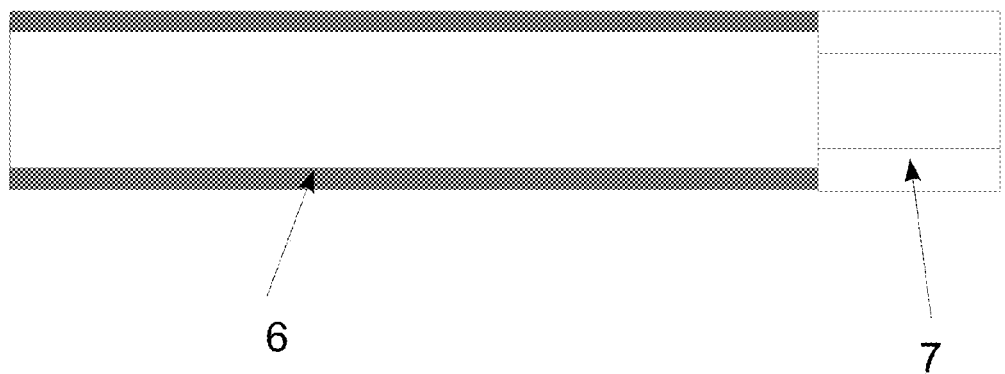
FIG. 3 is a schematic diagram of the inner cladding casing component of the invention.

As shown in FIG. 2, the core rod component is produced by fusing and splicing the core layer rod 5 and the hollow shaft 4 together. A plurality of vents is drilled on the hollow shaft 4 at the end near the core layer rod 5. As shown in FIG. 3, the inner cladding casing component is produced by fusing and splicing an inner cladding casing 6 and a hollow shaft 7 together. The inner diameter of the inner cladding casing 6 is at least 0.3 mm larger than the outer diameter of the core layer rod 5. The inner cladding casing 6 of the inner cladding casing component covers the outside of the core layer rod 5, and the distance between the inner cladding casing 6 and the core layer rod 5 is 0.15 to 5 mm.

Figure 4:
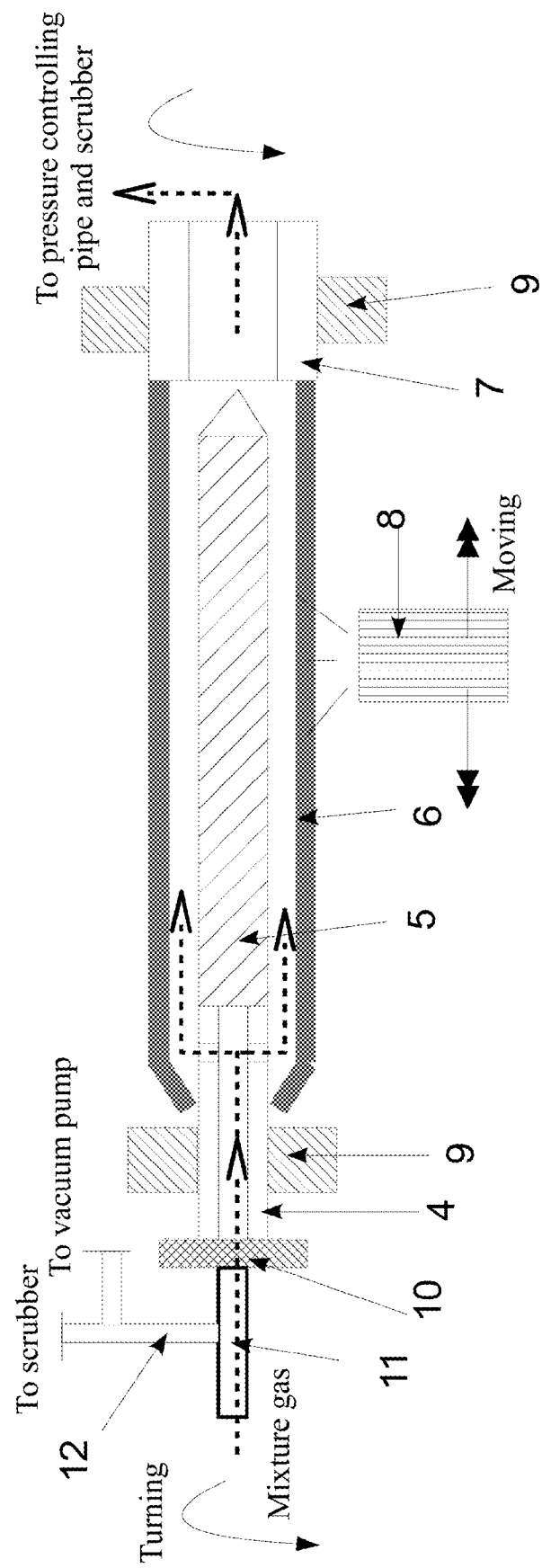
FIG. 4 is a schematic diagram of the process of assembling tubes, getting rid of moisture, and scrubbing interface.

The hollow shaft 4 of the core rod component and the hollow shaft 7 of the inner cladding casing component are clamped respectively in two chucks 9 of a glass lathe. The outer end of the hollow shaft 4 of the core rod component is connected to an external gas pipe 11 via a rotary joint 10. Various gases are transported through the external gas pipe 11. These gases include, while not limited to, purge gas, dry gas, and etching gas. The purge gas may be purified $N_2$, $O_2$, He, etc. The dry gas may be $Cl_2$. The etching gas may be $CF_4$, $C_2F_6$, $SF_6$, etc. The external gas pipe 11 is connected to the pressure controlling pipe 12 and a scrubber. The scrubber is adapted to treat exhaust gases. The outer end of the hollow shaft 7 of the inner cladding casing component is connected to the scrubber and is adapted to control the pressure between the inner cladding casing 6 and the core layer rod 5. The outer end of the inner cladding casing 6 in the inner cladding casing component is connected to the hollow shaft 4 of core rod component in an airtight manner, and the connection is placed outside the vents to ensure that the external gas pipe 11 is communicated with the gap between the inner cladding casing 6 and the core layer rod 5. The airtight manner may be mechanical airtight or fusion-sealing manner in high temperature. In FIG. 4, fusion-sealing manner is used.

The high temperature heat source 8 is arranged on the outside of the inner cladding casing 6. The high temperature heat source may be a gas blowtorch or furnace.

The refractive index profile of the preform produced by above-mentioned apparatus includes the core layer 1, the inner cladding layer 2, and the outer cladding layer 3.

The above-mentioned core layer 1 is the core layer rod 5 produced by VAD or OVD method. It includes the core layer 1 and a small fraction of inner cladding. In the core layer rod, cladding-to-core diameter ratio may be less than 4, and may be close to 1. The inner cladding layer 2 which has a particular refractive index profile is an inner cladding casing 6 produced by other methods. The outer cladding layer 3 is produced by deposition method or is produced from casing.

The key step is combining the inner cladding casing 6 and the core layer rod 5 to form a solid core rod by a modified rod-in-tube method. In traditional rod-in-tube method, because the inner surface of the inner cladding 6 and the outer surface of the core layer rod 5 are directly exposed to the air, moisture and other impurities in the air will permeate and pollute the inner cladding casing 6 and the core layer rod 5 when they are heated under a high temperature, which affects the quality of the optical fiber and causes an increased attenuation of optical fiber at 1383 nm. The less the cladding-to-core diameter ratio is, the more largely the disadvantages of the traditional rod-in-tube method affect the quality of the optical fiber. The conventional rod-in-tube method is modified in order to get rid of the moisture and other impurities in the gap.

In the modified method, the two components are first produced. FIG. 2 shows the core rod component produced by fusing and splicing a core layer rod 5 and a hollow shaft 4 together. A plurality of vents is drilled on the hollow shaft 4 at the end near the core layer rod 5. As shown in FIG. 3, the inner cladding casing component is produced by fusing and splicing an inner cladding casing 6 and a hollow shaft 7 together. The inner diameter of the inner cladding casing 6 is at least 0.3 mm larger than the outer diameter of the core layer rod 5.

Figure 5:
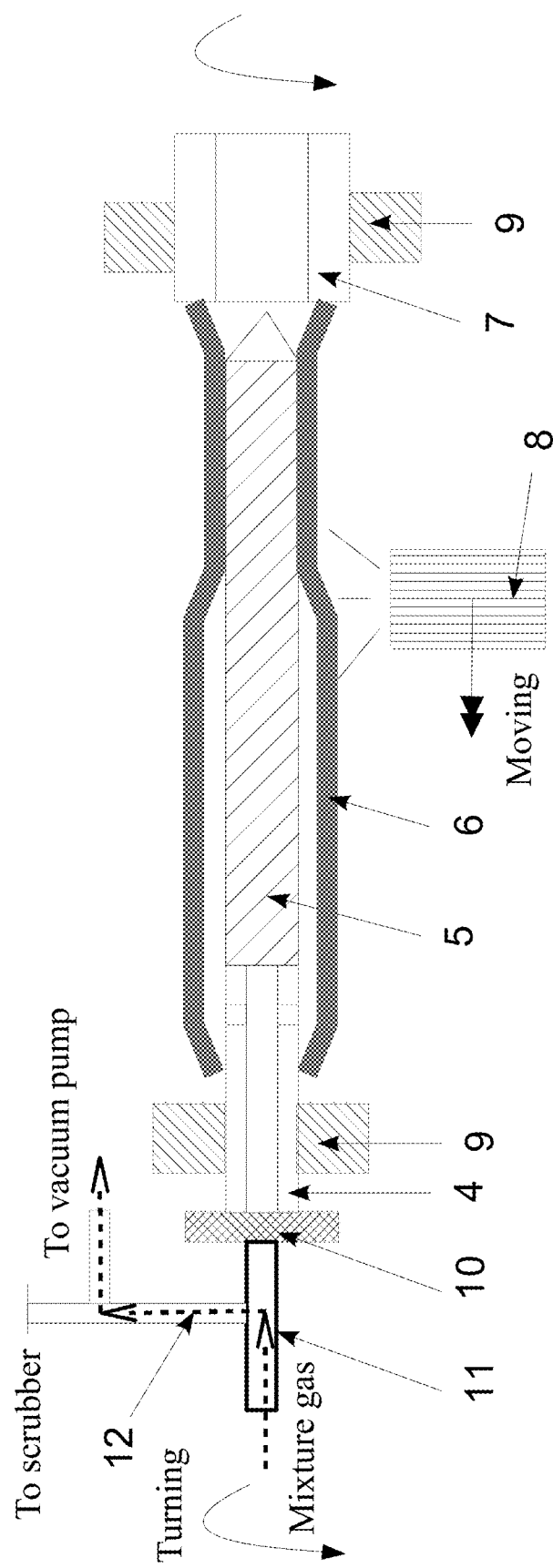
FIG. 5 is a schematic diagram of the modified rod-in-tube method.

The method may be performed in a horizontal or vertical glass lathe. FIG. 4 is a schematic diagram showing the process of assembling the two components and purging the gas between the two components. After assembly, the gap between the inner cladding casing 6 and the core layer rod 5 is 0.15-5 mm. The high temperature heat source 8 in the figure may be, while not limited to, a gas blowtorch or furnace. FIG. 5 is a schematic diagram of the modified rod-in-tube method.

As shown in FIG. 4, during the process of assembling, the hollow shaft 4 of the core rod component and the hollow shaft 7 of the inner cladding casing component are clamped respectively in two chucks 9 of the glass lathe. The outer end of the hollow shaft 4 of the core rod component is connected to the external gas pipe 11 via a rotary joint 10. Various gases are transported through the external gas pipe 11. These gases include, while not limited to, purge gas, dry gas, and etching gas. The purge gas may be purified $N_2$, $O_2$, He, etc. The dry gas may be $Cl_2$. The etching gas may be $CF_4$, $C_2F_6$, $SF_6$, etc. The external gas pipe 11 is connected to the pressure controlling pipe 12 and a scrubber. The scrubber is adapted to treat exhaust gas. The outer end of the hollow shaft 7 of the inner cladding casing component is connected to the scrubber and is used to control the pressure within the gap between the inner cladding casing 6 and the core layer rod 5. The outer end of the inner cladding casing 6 in the inner cladding casing component needs to be connected to the hollow shaft 4 of core rod component in an airtight manner. The connection position needs to be placed outside the vents to ensure that the external gas pipe 11 is communicated with the gap between the inner cladding casing 6 and the core layer rod 5. The airtight manner may be mechanical airtight or fusion-sealing manner in high temperature. Fusion-sealing manner is used.

Further instruction of the invention is provided below with an exemplary embodiment.

A core layer rod is produced by VAD method. After the processes of sintering, extending, and surface treatment, the outer diameter of the core layer rod 5 is 16.2 mm, and the length thereof is 1450 mm. The refractive index profile of the core layer rod 5 is measured, and the cladding-to-core diameter ratio of the core layer rod 5 is approximately 1.78. The inner cladding casing 6 is produced from a material having a low hydroxyl content (OH: approximately 0.2 ppm). The sectional area of the inner cladding casing 6 is 890 $mm^2$ and the inner diameter thereof is 17.6 mm.

The inner cladding casing 6 and the core layer rod 5 are fused together to produce a core rod by modified rod-in-tube method, including the following steps:

Referring to FIG. 2 and FIG. 3, the following steps 1 and 2 are the processes of producing the core rod component and the inner cladding casing component. Referring to FIG. 4, the following steps 3 to 9 are the processes of assembling and purging. Referring to FIG. 5, the following steps 10 to 12 are the processes of fusing. The high temperature heat source 8 in the glass lathe is a blowtorch with oxyhydrogen flame. The flow rate ratio of oxygen to hydrogen is 1:2.

A method for producing a depressed-cladding core rod of an ultra-low water peak optical fiber, including the following steps:

1) Producing the core rod component: using the glass lathe to fuse and splice the core layer rod 5 and the hollow shaft 4 together.

2) Producing the inner cladding casing component: using the glass lathe to fuse and splice the inner cladding casing 6 and the hollow shaft 7 together, the inner diameter of the inner cladding casing 6 is at least 0.3 mm larger than the outer diameter of the core layer rod 5.

3) Clamping the core rod component and the inner cladding casing respectively in two chucks 9 of the glass lathe and disposing the inner cladding casing 6 outside the core layer rod 5, the distance between the inner cladding casing 6 and the core layer rod 5 is 0.15 to 5 mm.

4) Cutting off the connection among the pressure controlling pipe 12, the scrubber, and a vacuum pump, then connecting the hollow shaft 4 of the core rod component to the external gas pipe 11 via the rotary joint 10, and then connecting the hollow shaft 7 of the inner cladding casing to the scrubber.

5) Connecting the inner cladding casing 6 to the hollow shaft 4 of the core rod component hermetically.

6) Turning on the glass lathe, rotational speeds of the two chucks are 20 to 100 rpm.

7) Transporting a first mixture gas comprising a purge gas and a dry gas to the core rod hollow shaft at room temperature for approximate 2 minutes via the external gas pipe 11, a flow rate ratio of the purge gas to the dry gas is from 20:1 to 80:1.

8) While transporting the first mixture gas to the core rod hollow shaft continuously in a flow rate ratio of the purge gas to the dry gas of from 20:1 to 80:1, moving the high temperature heat source 8 back and forth twice to warm the inner cladding casing 6 properly, a speed of moving the high temperature heat source 8 is 50 to 200 mm per minute and a temperature of an inner wall of the inner cladding casing 6 is approximately 300° C. to 800° C.

9) Transporting a second mixture gas comprising the purge gas and an etching gas to the core rod hollow shaft to clean the interfaces of the glass, the flow rate ratio of the purge gas to the etching gas is 5:1 to 20:1; then moving the high temperature heat source 8 slowly from where the second mixture gases flow in to where the second mixture gases flow out to heat the inner surface of the inner cladding casing 6 to a temperature of 1200° C. to 1900° C. so that the etching gas decomposes and reacts with the glass, and the moving speed of the heat source is 20 to 100 mm per minute; and then adjusting the pressure within the gap between the inner cladding casing 6 and the core layer rod 5 for preventing the outer diameter of the inner cladding casing 6 from shrinking or expanding at high temperature, the pressure within the gap between the inner cladding casing 6 and the core layer rod 5 is controlled to 30 Pa to 400 Pa.

10) Transporting the first mixture gas to the core rod hollow shaft, the flow rate ratio of the purge gas to the dry gas is 20:1 to 80:1, and the pressure within the gap between the inner cladding casing 6 and the core layer rod 5 is lower than 60 Pa at this moment; then heating the inner cladding casing 6 with the high temperature heat source 8 at the end where the gases flow out, i.e., at the end near the hollow shaft 7, to induce shrinkage of the inner cladding casing; and then opening the pressure controlling pipe 12 and fusing the inner cladding casing and the core layer rod together when the gap between the inner cladding casing 6 and the core layer rod 5 almost disappears.

11) Continuously transporting the first mixture gas comprising the purge gas and the dry gas, the flow rate ratio of the purge gas to the dry gas is 20:1 to 80:1, the tube pressure is controlled according to the thickness of the inner cladding casing in a range of from +60 Pa to −99 kPa; then opening the connection between pressure controlling pipe 12 and the vacuum pump when a negative pressure is required, and then moving the high temperature heat source 8 towards where the gases flow in to heat the inner cladding casing and to fuse the inner cladding casing 6 with the core layer rod 5, the speed of moving the high temperature heat source is 5 to 100 mm per minute.

12) controlling a vacuum degree of gases in the external gas pipe 11 and the pressure controlling pipe 12 in a range of from +60 Pa to −99 kPa, controlling the temperature of high temperature heat source 8 in a range of 1200° C. to 1900° C., and controlling the speed of moving the high temperature heat source to be 5 to 100 mm per minute to fuse the inner cladding casing 6 with the core layer rod 5 to provide a depressed-cladding core rod having no interfacial air bubbles and air lines and having an acceptable roundness. Therefore, a depressed-cladding core rod of ultra-low water peaks is produced.

The above-mentioned purge gas may be purified $N_2$, $O_2$, or He; the dry gas may be $Cl_2$; and the etching gas may be $CF_4$, $C_2F_6$, or $SF_6$.

The refractive index profile of the core rod produced according to the invention is shown in FIG. 1. The core rod having a cladding-to-core diameter ratio of 4.06 is used to produce preform of an optical fiber by depositing an outer cladding with soot method. The attenuation of the optical fiber which is produced by drawing such core rod is less than 0.33 dB/km at 1383 nm. In international standard ITU-T G. 652.D, the upper limit of the attenuation at 1383 nm is 0.35 dB/km Thus, the optical fiber produced by this modified rod-in-tube method satisfies the demand for a low water peak optical fiber. It is suitable for long-distance transmission and largely reduces the cost on optical amplifiers and repeaters which are usually required in long distance transmission. Furthermore, it would apparently reduce the cost of maintenance.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A system for producing a depressed-cladding core rod of an ultra-low water peak optical fiber, the system comprising:
   a core rod component comprising a core layer rod and a core rod hollow shaft, said core rod hollow shaft comprising a first core rod hollow shaft end, a second core rod hollow shaft end, and a plurality of vents;
   an inner cladding casing component comprising an inner cladding casing and a casing hollow shaft, and said casing hollow shaft comprising a first casing hollow shaft end and a second casing hollow shaft end;
   a high temperature heat source;
   a glass lathe having two chucks;
   a rotary joint;
   an external gas pipe;
   a pressure controlling pipe;
   a scrubber; and
   a vacuum pump;
   wherein:
   said first core rod hollow shaft end is fused and sliced onto said core layer rod;
   said plurality of vents is arranged at said first core rod hollow shaft end;
   said first casing hollow shaft end is fused and sliced onto said inner cladding casing;
   said core layer rod is inserted into said inner cladding casing and a gap is formed between said inner cladding casing and said core layer rod;
   said second core rod hollow shaft end and said second casing hollow shaft end are disposed in said two chucks, respectively;
   said second core rod hollow shaft end is connected to said external gas pipe via said rotary connector for transporting gases through said external gas pipe to said core rod hollow shaft;
   one end of said pressure controlling pipe is connected to said external gas pipe and the other end of said pressure controlling pipe is connected to said scrubber;
   said vacuum pump is connected to said pressure controlling pipe;
   said second casing hollow shaft end is connected to said scrubber for exhausting gases and controlling pressure within said gap;
   said inner cladding casing is connected to said first core rod hollow shaft end hermetically and said plurality of vents is enclosed by said inner cladding casing, whereby said external gas pipe is connected to said gap via said plurality of vents; and
   said high temperature heat source is arranged outside said inner cladding casing for fusing said inner cladding casing onto said core layer rod to form the depressed-cladding core rod.

2. The system of claim 1, wherein an inner diameter of said inner cladding casing is at least 0.3 mm larger than an outer diameter of said core layer rod.

3. The system of claim 1, wherein a width of said gap is 0.15 to 5 mm.

4. The system of claim 1, wherein said gases comprise a purge gas, a dry gas, and an etching gas; said purge gas is purified $N_2$, $O_2$, or He; said dry gas is $Cl_2$; and said etching gas is $CF_4$, $C_2F_6$, or $SF_6$.

5. The system of claim 1, wherein said high temperature heat source is a gas blowtorch or a furnace.

6. The system of claim 1, wherein said core layer rod comprises a core layer and a cladding layer; and the ratio of an outer diameter of said cladding layer to an outer diameter of said core layer is less than 4.

7. The system of claim 1, wherein said inner cladding casing comprises a refractive index profile having central depression.

8. The system of claim 1, wherein the depressed-cladding core rod is adapted to be inserted into an outer cladding casing, and said outer cladding casing is adapted to be fused onto the depressed-cladding core rod to form a preform of the ultra-low water peak optical fiber.

9. An assembly for forming a depressed-cladding core rod of an ultra-low water peak optical fiber, the assembly comprising:
   a core rod component comprising a core layer rod and a core rod hollow shaft, said core rod hollow shaft comprising a first core rod hollow shaft end, a second core rod hollow shaft end, and a plurality of vents; and
   an inner cladding casing component comprising an inner cladding casing and a casing hollow shaft, and said casing hollow shaft comprising a first casing hollow shaft end and a second casing hollow shaft end;
   wherein:
   said first core rod hollow shaft end is fused and sliced onto said core layer rod;
   said plurality of vents is arranged at said first core rod hollow shaft end;
   said first casing hollow shaft end is fused and sliced onto said inner cladding casing;
   said core layer rod is inserted into said inner cladding casing and a gap is formed between said inner cladding casing and said core layer rod;
   said second core rod hollow shaft end is adapted for receiving external gases;
   said second casing hollow shaft end is adapted for exhausting gases and controlling pressure within said gap;
   said inner cladding casing is connected to said first core rod hollow shaft end hermetically and said plurality of vents is enclosed by said inner cladding casing, whereby said core rod hollow shaft is connected to said gap via said plurality of vents; and said inner cladding casing is adapted to be fused onto said core layer rod to form the depressed-cladding core rod.

10. The assembly of claim 9, wherein an inner diameter of said inner cladding casing is at least 0.3 mm larger than an outer diameter of said core layer rod.

11. The assembly of claim 9, wherein a width of said gap is 0.15 to 5 mm.

12. The assembly of claim 9, wherein said core layer rod comprises a core layer and a cladding layer; and the ratio of an outer diameter of said cladding layer to an outer diameter of said core layer is less than 4.

13. The assembly of claim 9, wherein said inner cladding casing comprises a refractive index profile having central depression.

14. The assembly of claim 9, wherein the depressed-cladding core rod is adapted to be inserted into an outer cladding casing, and said outer cladding casing is adapted to be fused onto the depressed-cladding core rod to form a preform of the ultra-low water peak optical fiber.

* * * * *